United States Patent
Bjork

(12) 
(10) Patent No.: US 8,057,931 B2
(45) Date of Patent: Nov. 15, 2011

(54) BATTERY BUSING SCHEME

(75) Inventor: James B. Bjork, Tucson, AZ (US)

(73) Assignee: Securaplane Technologies, Inc., Tucson, AZ (US)

( * ) Notice: Subject to any disclaimer, the term of this patent is extended or adjusted under 35 U.S.C. 154(b) by 1238 days.

(21) Appl. No.: 11/736,303

(22) Filed: Apr. 17, 2007

(65) Prior Publication Data

US 2008/0124617 A1 May 29, 2008

Related U.S. Application Data

(60) Provisional application No. 60/792,876, filed on Apr. 18, 2006.

(51) Int. Cl.
*H01M 6/42* (2006.01)
(52) U.S. Cl. .......................... 429/159; 429/158; 429/162
(58) Field of Classification Search .................. 429/158, 429/159, 162
See application file for complete search history.

(56) References Cited

U.S. PATENT DOCUMENTS

| | | |
|---|---|---|
| 3,776,778 A | 12/1973 | Azuma et al. |
| 3,841,915 A | 10/1974 | Eberle |
| 4,371,597 A | 2/1983 | Ikeda et al. |
| 4,957,829 A | 9/1990 | Holl |
| 5,426,694 A | 6/1995 | Hebert |
| 5,948,556 A | 9/1999 | Hall et al. |
| 6,275,681 B1 | 8/2001 | Vega et al. |
| 6,961,230 B2 | 11/2005 | Otsuka et al. |
| 2002/0015892 A1* | 2/2002 | Kitoh .............................. 429/243 |
| 2005/0031946 A1* | 2/2005 | Kruger et al. .................. 429/159 |
| 2006/0003222 A1* | 1/2006 | Mushiga et al. ............... 429/180 |
| 2006/0019155 A1* | 1/2006 | Seman et al. .................. 429/159 |

FOREIGN PATENT DOCUMENTS

| | | | |
|---|---|---|---|
| JP | 2004327311 A | * | 11/2004 |
| JP | 2005327677 A | * | 11/2005 |

OTHER PUBLICATIONS

Patent Cooperation Treaty, International Search Resort, Dec. 12, 2007, 2 pages.
Patent Cooperation Treaty, International Search Report, dated Feb. 8, 2008, 2 pages.

* cited by examiner

*Primary Examiner* — Barbara Gilliam
*Assistant Examiner* — Zachary Best
(74) *Attorney, Agent, or Firm* — Wilmer Cutler Pickering Hale & Dorr LLP.

(57) ABSTRACT

A battery including: a plurality of battery cells arranged side-by-side, each battery cell including a terminal tab for delivering power from the cell; a bus plate made of an electrically non-conductive material, the bus plate also having an array of holes formed therein, the array of holes defining a plurality of hole pairs, wherein the terminal tab from each cell of the plurality of cells extends through a corresponding different hole in the array of holes, wherein for each hole pair of the plurality of hole pairs, the terminal tabs extending through that hole pair are folded one over the other to produce overlapping tabs for that hole pair; and a plurality of clamps each of which clamps together the overlapping tabs of a corresponding different hole pair.

20 Claims, 4 Drawing Sheets

BATTERY BUSING SCHEME

This application claims the benefit of U.S. Provisional Application No. 60/792,876, filed Apr. 18, 2006, all of which is incorporated herein by reference.

TECHNICAL FIELD

This invention relates generally to multi-cell batteries and interconnecting the cells of multi-cell batteries.

BACKGROUND AND SUMMARY OF THE INVENTION

In today's high demand for more efficient battery power and the development of thin plate batteries, methods of incorporating these cells into industry applications has led to creating new busing concepts and circuit protection that was not required for past battery technologies. The battery packs must meet the high power demands and be capable of passing large amounts of current safely from the thin plate battery assemblies. Moreover, the thin plate batteries allow one to utilize minimal space for the applications enclosure with all the components required for the battery technology.

Applications for thin plate technologies need to meet both safety and performance requirements. The busing concept described herein introduces a method that can help protect the sensitive packaging of the cell as well as provide all the necessary components required for optimal performance and safety. Certain thin plate chemistry demands more protection than other chemistries thus requiring power regulation and load balancing as well as thermal monitoring and short-circuit protection. The concepts described herein provide methods for integrating both internal and external monitoring applications within the battery package.

With the introduction of the thin plate cells into high-power applications, the high current output levels require busing methods that can handle those current loads with minimal impedance and without any resulting damage to the cells. The anode and cathode plates from which the power is extracted from the battery are of very sensitive parts of the packaging and must be able to withstand vibration. The concepts described herein will allow one to safely bus the batteries together and design a complete, capacity-rated output battery for the required application.

The busing concept described herein utilizes components that enable one to reduce the assembled height of the packaging of the battery pack as compared to prior art. The concept reduces the need for large gauge inter-connect cabling by incorporating bus clamps for the main power inter-connects. Internal monitoring circuitry can also be incorporated into a printed circuit board which is part of the bus assembly. Utilizing all of the components of the concepts described herein will allow a minimal envelope for the battery pack into its enclosure.

This concepts described herein, in their simplicity, should provide an adequate means of interconnecting thin plate battery cells, as sensitive as they are, into a wide variety of fields in the power application industry. The design concepts described herein were initially targeted for military and commercial aircraft applications but can be used in many other applications for the thin plate battery footprint.

In general, in one aspect the invention features a battery including: a plurality of battery cells arranged side-by-side, each battery cell including a terminal tab for delivering power from the cell; a bus plate made of an electrically non-conductive material, the bus plate also having an array of holes formed therein, the array of holes defining a plurality of hole pairs, wherein the terminal tab from each cell of the plurality of cells extends through a corresponding different hole in the array of holes, wherein for each hole pair of the plurality of hole pairs, the terminal tabs extending through that hole pair are folded one over the other to produce overlapping tabs for that hole pair; and a plurality of clamps each of which clamps together the overlapping tabs of a corresponding different hole pair.

Other embodiments include one or more of the following features. The plurality of clamps are made of an electrically conducting material, e.g. copper. The battery further including a plurality of fasteners securing the plurality of clamps to the bus plate, wherein the plurality of fasteners are screws. The plurality of clamps includes a first clamp that clamps the overlapping tabs of each of two neighboring hole pairs and electrically connects the overlapping tabs of those two neighboring hole pairs. The battery further including a plurality of terminal forms, each terminal form located between the two holes of a different hole pair and providing a structure over which the two overlapping tabs for that hole pair are folded. Each of the plurality of terminal forms has rounded upper edges. The plurality of terminal forms are integrally formed parts of the bus plate or the plurality of terminal forms are separate parts that are mounted on the bus plate. The battery further including circuitry mounted on the bus plate, wherein the circuitry is battery monitoring circuitry and/or short protection circuitry, and/or temperature monitoring circuitry, and/or load balancing circuitry. The battery also includes a protection plate mounted on and protecting most of the bus plate. The bus plate is made of a glass fiber resin. The battery cells of the plurality of battery cells are thin plate battery cells.

In general, in another aspect, the invention features a battery including: a plurality of battery cells arranged side-by-side, each battery cell including a first terminal tab and a second terminal tab, said first and second terminal tabs for delivering power from the cell; a bus plate made of an electrically non-conductive material and having a first array of holes and a second array of holes formed therein, the first array of holes defining a first plurality of hole pairs and the second array of holes defining a second plurality of hole pairs, wherein the first terminal tab from each cell of the plurality of cells extends through a corresponding different hole in the first array of holes, wherein the second terminal tab from each cell of the plurality of cells extends through a corresponding different hole in the second array of holes, wherein for each hole pair of the first and second plurality of hole pairs, the terminal tabs extending through that hole pair are folded one over the other to produce overlapping tabs for that hole pair; a first plurality of clamps each of which clamps together the overlapping tabs of a corresponding different hole pair among the first plurality of hole pairs; and a second plurality of clamps each of which clamps together the overlapping tabs of a corresponding different hole pair among the second plurality of hole pairs.

Depending on the configuration, current capacity, and maximum output requirements of the battery, in prior art designs simple wiring of the current from one cell to another necessitated not only numerous interconnections but also space to accommodate that wiring.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
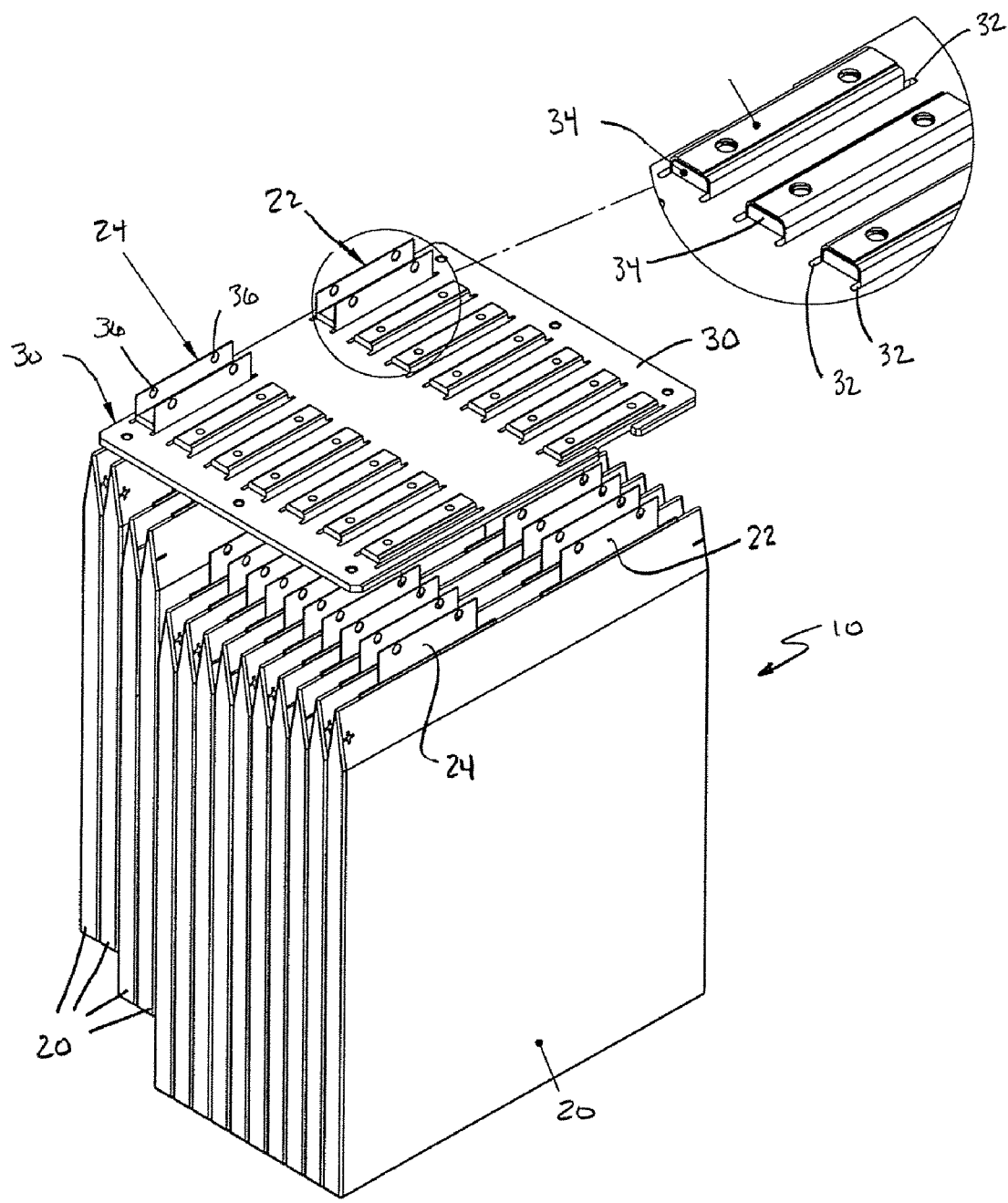
FIG. 1 illustrates a bus plate for interconnecting multiple thin plate cells.

Referring to FIG. 1, a battery 10 of the described embodiment is made up of a set of thin plate cells 20 arranged next to each other. Each thin plate cell 20 is rectangularly shaped, has a thin profile and includes two terminals plates, a cathode (or negative) terminal plate 22 and an anode (or positive) terminal plate 24, both extending up from the top of the cell. The terminal plates are thin metal tabs made of copper and electroplated plated with tin to prevent corrosion. Cells 20 are all arranged so that all of their terminal plates extend in the same direction, which in FIG. 1 is upward. In this example, there are 14 thin film cells arranged within the battery so that their polarity alternates in pairs. In other words, the first two cells have their anodes on the left, the next two cells have their cathodes on the left, and that pattern repeats for the rest of the cells in the battery. As will become apparent shortly, when the electrical interconnections are described, this arrangement will produce a 2-parallel/7-series configuration in which the overall voltage produced by the battery is 7 times the voltage of a single cell.

Battery 10 also includes a bus plate 30 that is used to retain the cells within the desired arrangement and that enables the cells to be electrically interconnected. Bus plate 30 includes two columns of parallel slots 32. In each column, the slots are arranged in pairs with a terminal form 34 located between the two slots within each pair. In this embodiment, the terminal forms are integrally formed parts of the bus plate. When the bus plate is assembled onto the cells, the terminal plates of the cells pass through the slots and extend beyond the top surface of bus plate 30. Terminal forms 34 provide a raised area over which the battery terminal tabs are folded to make an electrical connection between neighboring cells. The two terminal tabs extending through the slots on either side of the terminal form are folded one over the other onto the terminal form. The terminal forms have rounded upper edges which enable the terminal plates to be folded over the form without requiring or causing any sharp bends that might damage the terminal tabs or the plating on the terminal tabs. In this example, each column of slots includes 14, one for each cell, and those 14 slots are arranged into 7 pairs with a terminal form for each pair.

In the described embodiment, bus plate 30 is made of Garolite G10™, which is a non-conductive glass fiber resin that is used in PCB manufacturing. One reason for using Garolite is that it accepts press-fit fasteners unlike many phenolics that could be used.

Each terminal form 34 includes two holes that align with two nuts (not shown) that are press fit into bus plate 30. Each terminal plate also includes two holes 36, which align with the two holes in the terminal form 34 when the terminal plate is folded over the terminal form.

Figure 2:
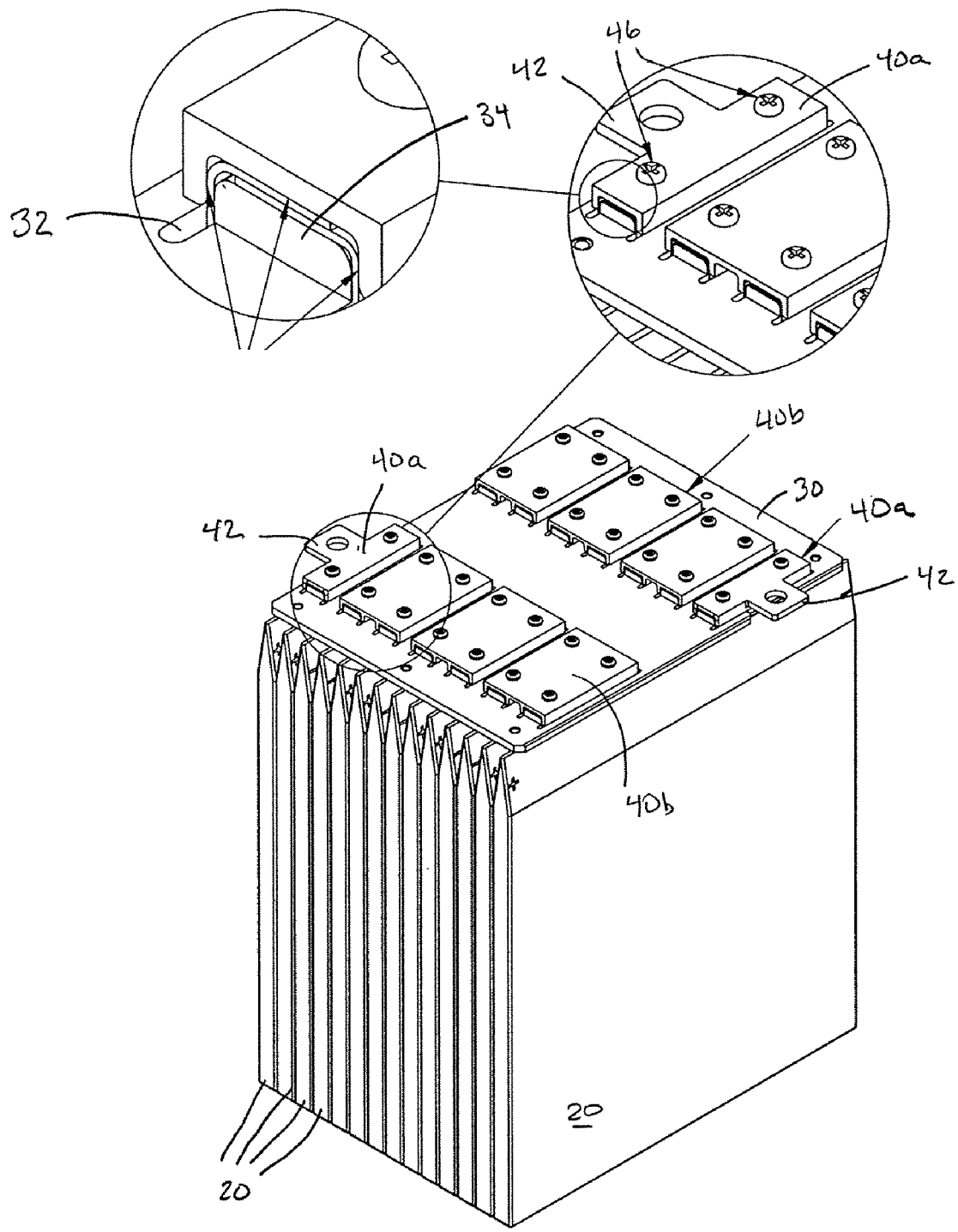
FIG. 2 illustrates bus clamps that are used to electrically interconnect the thin plate cells.

To secure the terminal plates to the bus plate and to electrically interconnect the battery cells, bus clamps 40 such as those shown in FIG. 2 are used. Two types of bus clamps are represented, namely, terminal bus clamps 40a and interconnect bus clamps 40b. Terminal bus clamps 40a provide terminals for connecting the battery to outside circuitry or systems (not shown). Interconnect bus clamps 40b are for electrically interconnecting groups of cells. In this example, terminal bus clamp 40a is a solid metal piece with a U-shaped channel formed on its underside which fits down onto the terminal form and through compression forces the two folded, overlapping terminal tabs into more intimate electrical contact with each other. Each terminal bus clamp 40a includes two holes that align with the two holes in terminal form 34 and it also includes an extension tab 42 to which electrical connection can be made to the battery. When terminal bus clamp 40a is pressed onto a terminal form, which has the two terminal tabs folded over it, the clamp is secured in place onto bus plate 30 by two screws 46 that are threaded into the nuts (not shown) in bus plate 30.

In this example, interconnecting clamps 40b are used to connect one pair of cells to a neighboring pair of cells. Interconnecting clamp is also a single piece of metal with two U-shaped channels formed in its backside, each channel positioned to align with a corresponding terminal form when the clamp is assembled onto bus plate 30. Clamp 40b also includes two pairs of holes, each pair of holes aligned with a corresponding pair of holes in the terminal forms onto which the clamp is fitted. As in the case of the terminal clamps, screws that pass through the holes and are threaded into underlying nuts which are press fit into bus plate 30.

Clamps 40a and 40b are made from a machined copper that is electroplated with tin to protect the copper from corrosion. The bus clamps and the bus plate enable one to both clamp and connect the cells together to achieve the desired series/parallel configuration. The thickness of the clamp is determined by the cross-sectional area that is needed to pass the desired current. Also, its design allows for strict weight calculations for weight sensitive applications. The described bus clamps are optimal for exact weight vs. requirement applications.

The U-shaped channels on the underside of the clamps are used to achieve the maximum contact to the surfaces of the terminal plates. This design utilizes a friction fit, tightly sandwiching the terminals between the terminal forms and the clamp so that there is complete contact across all surfaces of the clamp and the terminals. To improve the tightness of the clamping forces that are applied by the clamps, the depth of the channel is made to be less than the height of the terminal form. Thus, the clamp will not bottom out against the bus plate before it is sufficiently tightened down over the terminal form. The hardware that is utilized to fasten the clamps to the bus plate can also be utilized to make any necessary cable/circuitry connections to the appropriate terminals of the battery pack for operation and monitoring.

The battery pack wiring can be attached to the terminal extensions on the terminal clamps with hardware for charge and interface harness connections.

Busing of simple to complex series/parallel battery pack configurations can be achieved by using this bus clamp concept.

Figure 3:
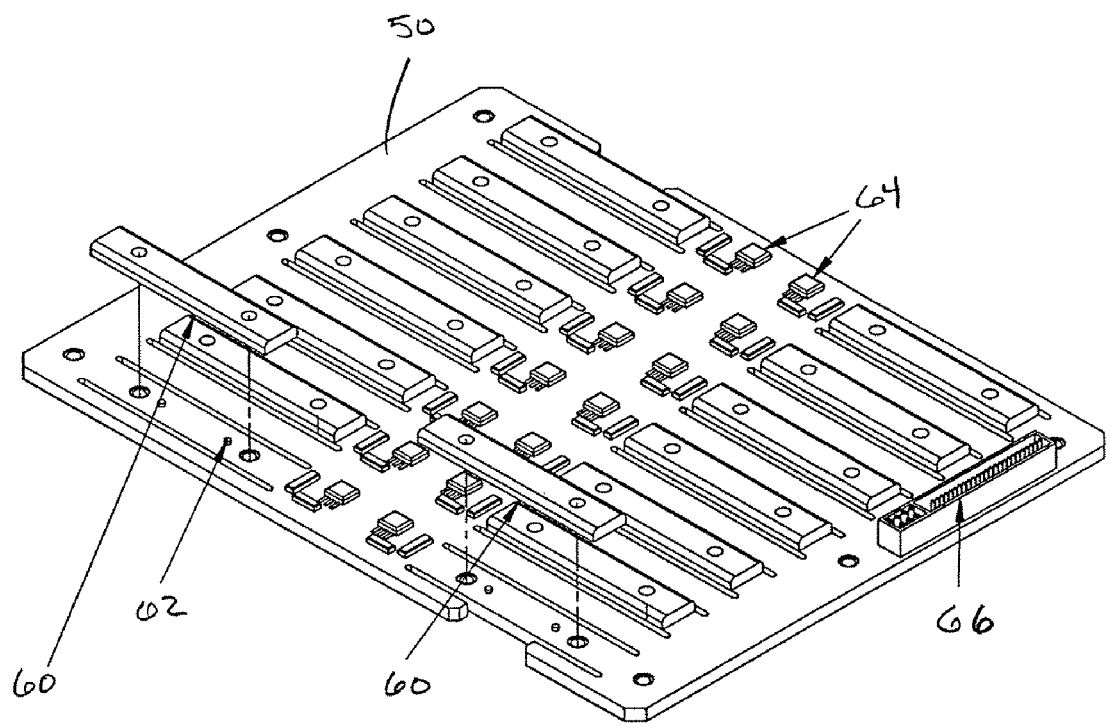
FIG. 3 illustrates a "smart" bus plate.

As suggested by FIG. 3, all required charge, monitoring, balancing, thermal, and short circuit protection devices can be embedded in or mounted on a bus plate to create a "smart" bus plate 50.

In the case of the smart bus plate, a printed circuit board is used as the bus plate and terminal forms 60 are components that are separately mounted onto the smart bus plate. The battery pack is clamped using the same principles described above. The terminal forms, which are made of Garolite, are separately added to the bus plate. They are placed with guide pins 62 for locating the terminal tabs evenly according to the battery cell footprint.

Much of the thin plate battery chemistry requires at least some form of electronic monitoring and may also require numerous safeguards in place for safety factors. The "smart" bus PCB will allow all of the necessary circuitry 64 to be added when internal monitoring is required for the battery enclosure. Embedding all of the electronics on the "smart" bus PCB enables one to minimize cabling by using a configurable connector 66 that provides the interface between the battery pack and other internal and/or external components. This reduces the amount of mounting hardware and allows for ease of installation and quick-disconnect.

The bus plate design also accommodates thin blanket heaters and/or foam dampening components for shock resistance and enhanced packaging methods. The thin plate battery technology can be very sensitive and may require packaging that can protect the cell within the parameters of normal operating conditions. Compression foams and other insulating materials can be placed between the cells for absorbing shock and preventing friction between cells. Thin blanket heaters can be placed in between the cells to keep the cells within a desired temperature range during operation. The bus plate concept allows for the use of all of the required components to provide a functionally protected battery pack.

Figure 4:
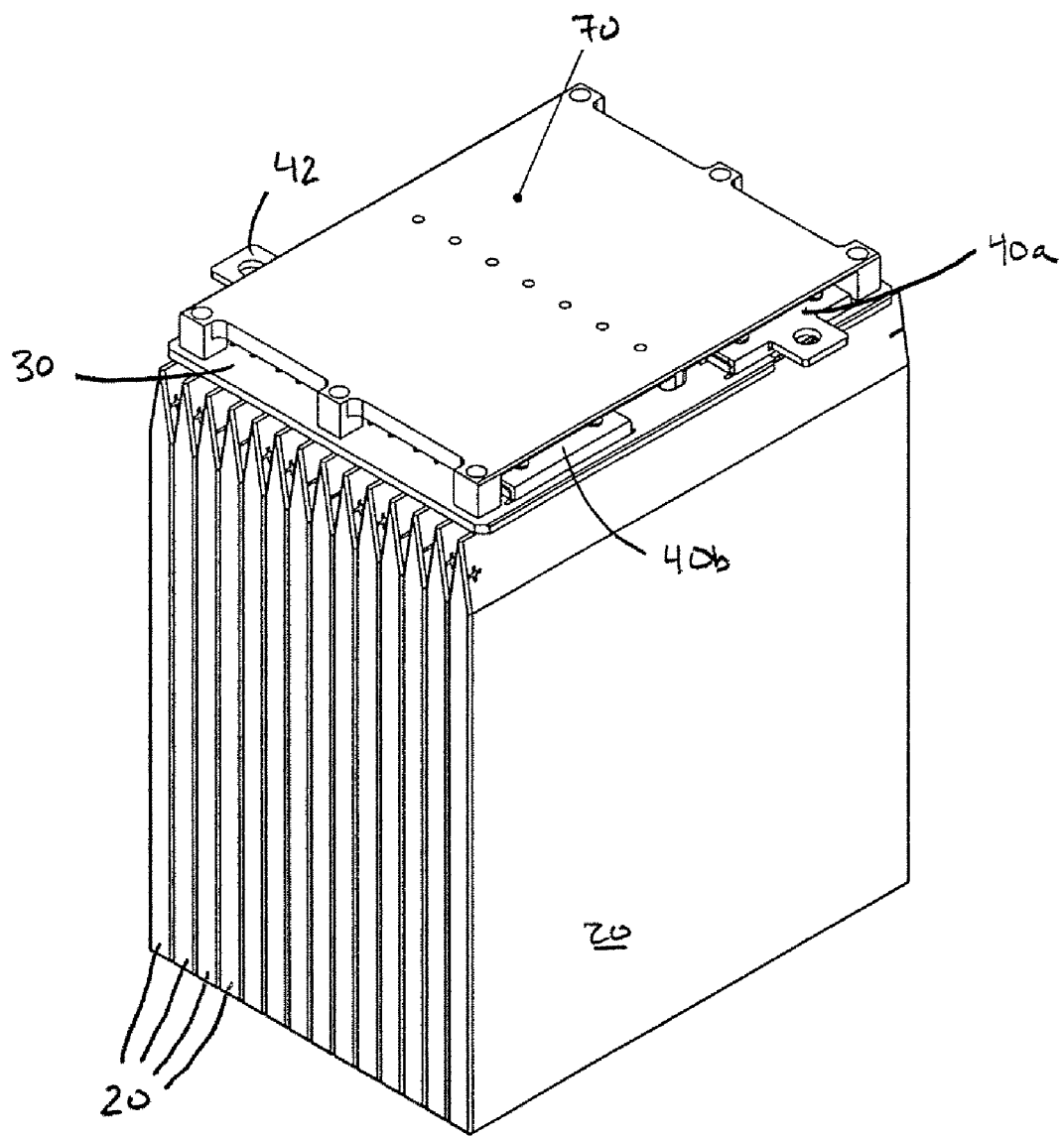
FIG. 4 illustrates a short protection plate.

Referring to FIG. 4, in order to protect the battery pack, a short protection plate 70 covers the bus clamps and the other sensitive upper areas of the battery pack thereby protecting it from short-circuiting or physical damage. This plate also provides a surface to contact to the applications enclosure for containment purposes. In the described embodiment, protection plate 70 is made of a standard PETP (polyethylene terephthalate polyester) Ertalyte™ which is used widely in the medical field. This piece can be machined or for mass production uses, it can be molded.

The short protection plate serves multiple purposes. With all the sensitive components of the battery pack exposed and posing a danger for short-circuits, it offers a means to protect these components while also providing a platform which serves to facilitate mounting the battery pack into an enclosure. The battery pack typically must be contained on all sides and still be able to expand and contract in its operating environment without any shorts and damage to the cell housings and electronics. The plate allows pressure to be applied to that portion of the battery pack that normally cannot even be touched due to the sensitive interconnections. The short protection plate mounts directly to the bus plate making it a fully contained power module.

Other embodiments are within the following claims.

What is claimed is:

1. A battery comprising:
    a plurality of battery cells arranged side-by-side, each battery cell including a terminal tab for delivering power from the cell;
    a bus plate made of an electrically non-conductive material, said bus plate also having an array of holes formed therein, the array of holes defining a plurality of hole pairs, wherein the terminal tab from each cell of the plurality of cells extends through a corresponding different hole in the array of holes, wherein for each hole pair of the plurality of hole pairs, the terminal tabs extending through that hole pair are folded towards each other one over the other to produce overlapping tabs for that hole pair; and
    a plurality of clamps including one clamp for each hole pair of the plurality of hole pairs and each of which clamps together the overlapping tabs of a corresponding different hole pair of the plurality of hole pairs.
2. The battery of claim 1, wherein the holes of the array of holes are elongated slots.
3. The battery of claim 1, wherein the plurality of clamps are made of an electrically conducting material.
4. The battery of claim 3, wherein the plurality of clamps are made of copper.
5. The battery of claim 1, further comprising a plurality of fasteners securing the plurality of clamps to the bus plate.
6. The battery of claim 5, wherein the plurality of fasteners are screws.
7. The battery of claim 1, further comprising a plurality of terminal forms, each terminal form located between the two holes of a different hole pair and providing a structure over which the two overlapping tabs for that hole pair are folded.
8. The battery of claim 7, wherein each of the plurality of terminal forms has rounded upper edges.
9. The battery of claim 7, wherein the plurality of terminal forms are integrally formed parts of the bus plate.
10. The battery of claim 7, wherein the plurality of terminal forms are separate parts that are mounted on the bus plate.
11. The battery of claim 1, further comprising circuitry mounted on the bus plate.
12. The battery of claim 11, wherein the circuitry comprises battery monitoring circuitry.
13. The battery of claim 11, wherein the circuitry comprises temperature monitoring circuitry.
14. The battery of claim 11, wherein the circuitry comprises load balancing circuitry.
15. The battery of claim 1, further comprising a protection plate mounted on and protecting most of the bus plate.
16. The battery of claim 1, wherein the bus plate is made of a glass fiber resin.
17. The battery of claim 1, wherein the battery cells of the plurality of battery cells are thin plate battery cells.
18. A battery comprising:
    a plurality of battery cells arranged side-by-side, each battery cell including a first terminal tab and a second terminal tab, said first and second terminal tabs for delivering power from the cell;
    a bus plate made of an electrically non-conductive material, said bus plate also having a first array of holes and a second array of holes formed therein, the first array of holes defining a first plurality of hole pairs and the second array of holes defining a second plurality of hole pairs, wherein the first terminal tab from each cell of the plurality of cells extends through a corresponding different hole in the first array of holes, wherein the second terminal tab from each cell of the plurality of cells extends through a corresponding different hole in the second array of holes, wherein for each hole pair of the first and second plurality of hole pairs, the terminal tabs extending through that hole pair are folded towards each other, one over the other to produce overlapping tabs for that hole pair;
    a first plurality of clamps including one clamp for each hole pair of the first plurality of hole pairs and each of which clamps together the overlapping tabs of a corresponding different hole pair among the first plurality of hole pairs; and
    a second plurality of clamps including one clamp for each hole pair of the second plurality of hole pairs and each of which clamps together the overlapping tabs of a corresponding different hole pair among the second plurality of hole pairs.
19. The battery of claim 1, wherein each clamp of the plurality of clamps clamps together only the overlapping tabs of the corresponding hole pair.
20. The battery of claim 18, wherein each clamp of the first plurality of clamps clamps together only the overlapping tabs of the corresponding hole pair.

* * * * *